United States Patent
Mills et al.

(10) Patent No.: US 12,043,378 B2
(45) Date of Patent: Jul. 23, 2024

(54) CONTROLLABLE VECTORED THRUST IN PROPULSION ASSEMBLIES

(71) Applicant: Bell Textron Inc., Fort Worth, TX (US)

(72) Inventors: Nathan Alexander Mills, Fort Worth, TX (US); Joshua Allan Edler, Bedford, TX (US)

(73) Assignee: Textron Innovations Inc., Providence, RI (US)

(*) Notice: Subject to any disclaimer, the term of this patent is extended or adjusted under 35 U.S.C. 154(b) by 178 days.

(21) Appl. No.: 17/341,492

(22) Filed: Jun. 8, 2021

(65) Prior Publication Data

US 2022/0388650 A1 Dec. 8, 2022

(51) Int. Cl.
*B64C 29/00* (2006.01)
(52) U.S. Cl.
CPC .................. *B64C 29/0033* (2013.01)
(58) Field of Classification Search
CPC .................................................. B64C 29/0033
See application file for complete search history.

(56) References Cited

U.S. PATENT DOCUMENTS

| | | | |
|---|---|---|---|
| 6,719,244 B1 * | 4/2004 | Gress | B64C 29/0033 244/7 R |
| 10,183,746 B2 | 1/2019 | McCullough et al. | |
| 10,421,540 B1 * | 9/2019 | Koelzer | B64C 29/0033 |
| 10,807,707 B1 * | 10/2020 | Ter Keurs | B64C 17/02 |
| 2018/0229833 A1 * | 8/2018 | Kimchi | B64C 17/02 |
| 2018/0297712 A1 * | 10/2018 | Oldroyd | B64C 39/08 |
| 2022/0250742 A1 * | 8/2022 | Bower | B64C 27/28 |

\* cited by examiner

*Primary Examiner* — Tien Q Dinh
*Assistant Examiner* — William L Gmoser
(74) *Attorney, Agent, or Firm* — Akona IP PC (57) ABSTRACT

A vehicle comprises a propulsion assembly that includes a rotor system configured to swivel about a pivot axis and a flight control system in communication with the propulsion assembly. In one embodiment, the pivot axis is fixedly oriented at an angle relative to a lateral axis of the vehicle in a plane defined by a longitudinal axis of the vehicle. The flight control system is configured to activate a particular operational mode of the propulsion assembly, in which the rotor system is configured to swivel about the pivot axis to move a rotor axis of the rotor system from a first gimbal angle to a second gimbal angle. In various embodiments, the gimbal angle is configured to change a center of gravity, or direction of thrust vectors, or attitude of the vehicle. The operational mode may comprise a one engine inoperative (OEI) mode in an example embodiment.

12 Claims, 11 Drawing Sheets

CONTROLLABLE VECTORED THRUST IN PROPULSION ASSEMBLIES

TECHNICAL FIELD

This disclosure relates in general to the field of aircraft and, more particularly, though not exclusively, to controllable vectored thrust in propulsion assemblies.

BACKGROUND

Unlike fixed-wing aircraft, vertical takeoff and landing ("VTOL") aircraft do not require runways. Instead, VTOL aircraft are capable of taking off, hovering, and landing vertically. One example of VTOL aircraft is a helicopter, which is a rotorcraft having one or more rotors that provide vertical lift and forward thrust to the aircraft. Helicopter rotors not only enable hovering and vertical takeoff and vertical landing, but also enable forward, aftward, and lateral flight. These attributes make helicopters highly versatile for use in congested, isolated or remote areas where fixed-wing aircraft may be unable to take off and land. Helicopters, however, typically lack the forward airspeed of fixed-wing aircraft.

A tiltrotor is another example of a VTOL aircraft. Tiltrotor aircraft utilize tiltable rotor systems that may be transitioned between a forward thrust orientation and a vertical lift orientation. The rotor systems are tiltable relative to one or more fixed wings such that the associated proprotors have a generally horizontal plane of rotation for vertical takeoff, hovering, and vertical landing and a generally vertical plane of rotation for forward flight, or airplane mode, in which the fixed wing or wings provide lift. In this manner, tiltrotor aircraft combine the vertical lift capability of a helicopter with the speed and range of fixed-wing aircraft.

VTOL aircraft may be manned or unmanned. An unmanned aerial vehicle ("UAV"), also commonly referred to as a "drone," is an aircraft without a human pilot aboard. UAVs may be used to perform a variety of tasks, including filming, package delivery, surveillance, and other applications. A UAV typically forms a part of an unmanned aircraft system ("UAS") that includes the UAV, a ground-based, or remote, controller, and a system of communication between the vehicle and controller.

SUMMARY

A vehicle comprises a propulsion assembly that includes a rotor system configured to swivel about a pivot axis and a flight control system in communication with the propulsion assembly. In one embodiment, the pivot axis is fixedly oriented at an angle relative to a lateral axis of the vehicle in a plane defined by a longitudinal axis of the vehicle. The flight control system is configured to activate a particular operational mode of the propulsion assembly, in which the rotor system is configured to swivel about the pivot axis to move a rotor axis of the rotor system from a first gimbal angle to a second gimbal angle. As used herein, the term "gimbal angle" refers to an angle between the rotor axis and the longitudinal axis of the vehicle, including any axes parallel to the longitudinal axis. In various embodiments, the gimbal angle is configured to change a center of gravity, or direction of thrust vectors, or attitude of the vehicle. The operational mode may comprise a one engine inoperative (OEI) mode in an example embodiment.

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements.

DETAILED DESCRIPTION

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Additionally, as referred to herein in this Specification, the terms "forward", "aft", "inboard", and "outboard" may be used to describe relative relationship(s) between components and/or spatial orientation of aspect(s) of a component or components. The term "forward" may refer to a spatial direction that is closer to a front of an aircraft relative to another component or component aspect(s). The term "aft" may refer to a spatial direction that is closer to a rear of an aircraft relative to another component or component aspect(s). The term "inboard" may refer to a location of a component that is within the fuselage of an aircraft and/or a spatial direction that is closer to or along a centerline of the aircraft (wherein the centerline runs between the front and the rear of the aircraft) or other point of reference relative to another component or component aspect. The term "outboard" may refer to a location of a component that is outside the fuselage of an aircraft and/or a spatial direction that farther from the centerline of the aircraft or other point of reference relative to another component or component aspect.

Further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying FIGURES.

Figure 1A:
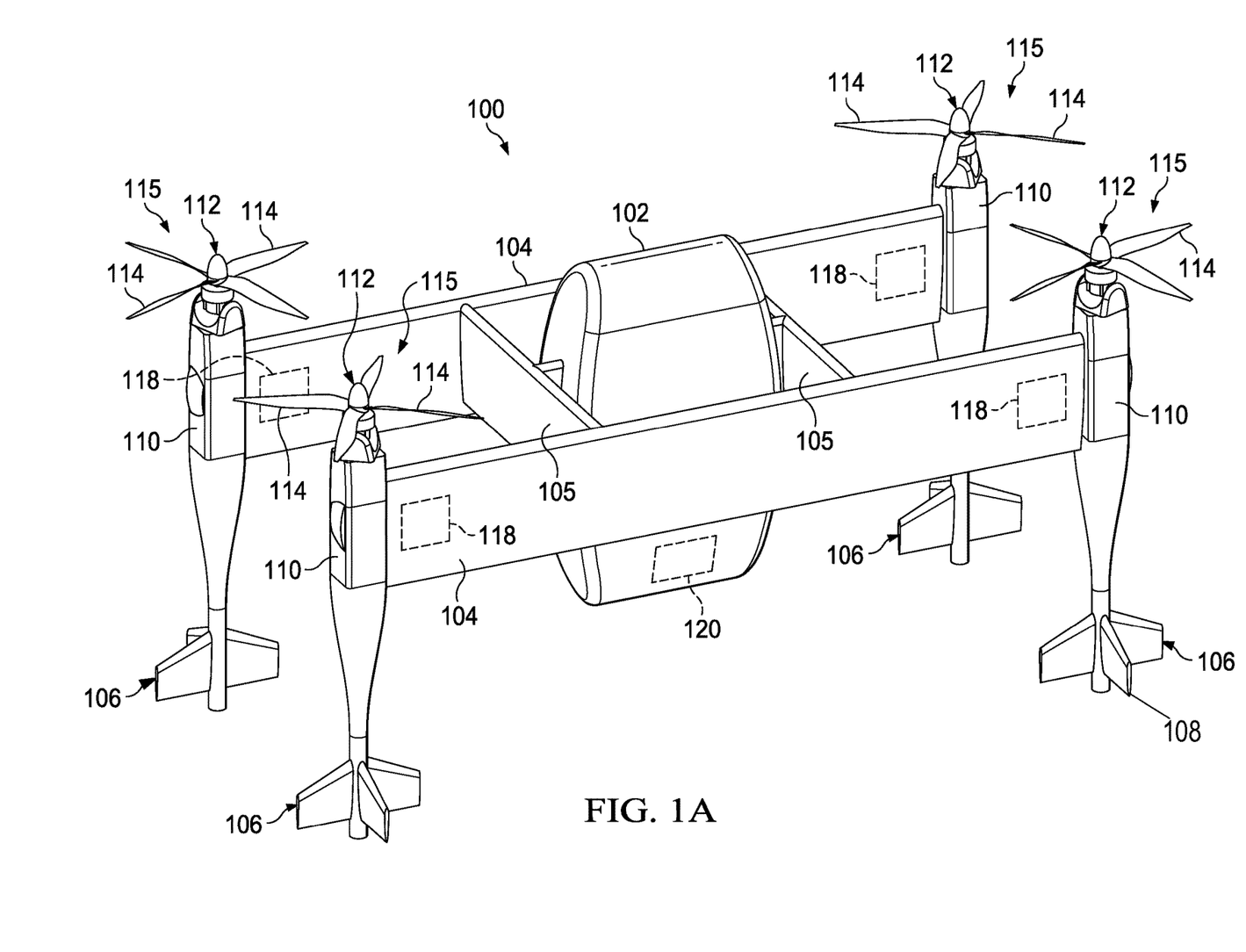
FIGS. 1A-1B are simplified diagrams of an example aircraft, in accordance with certain embodiments.
Figure 1B:
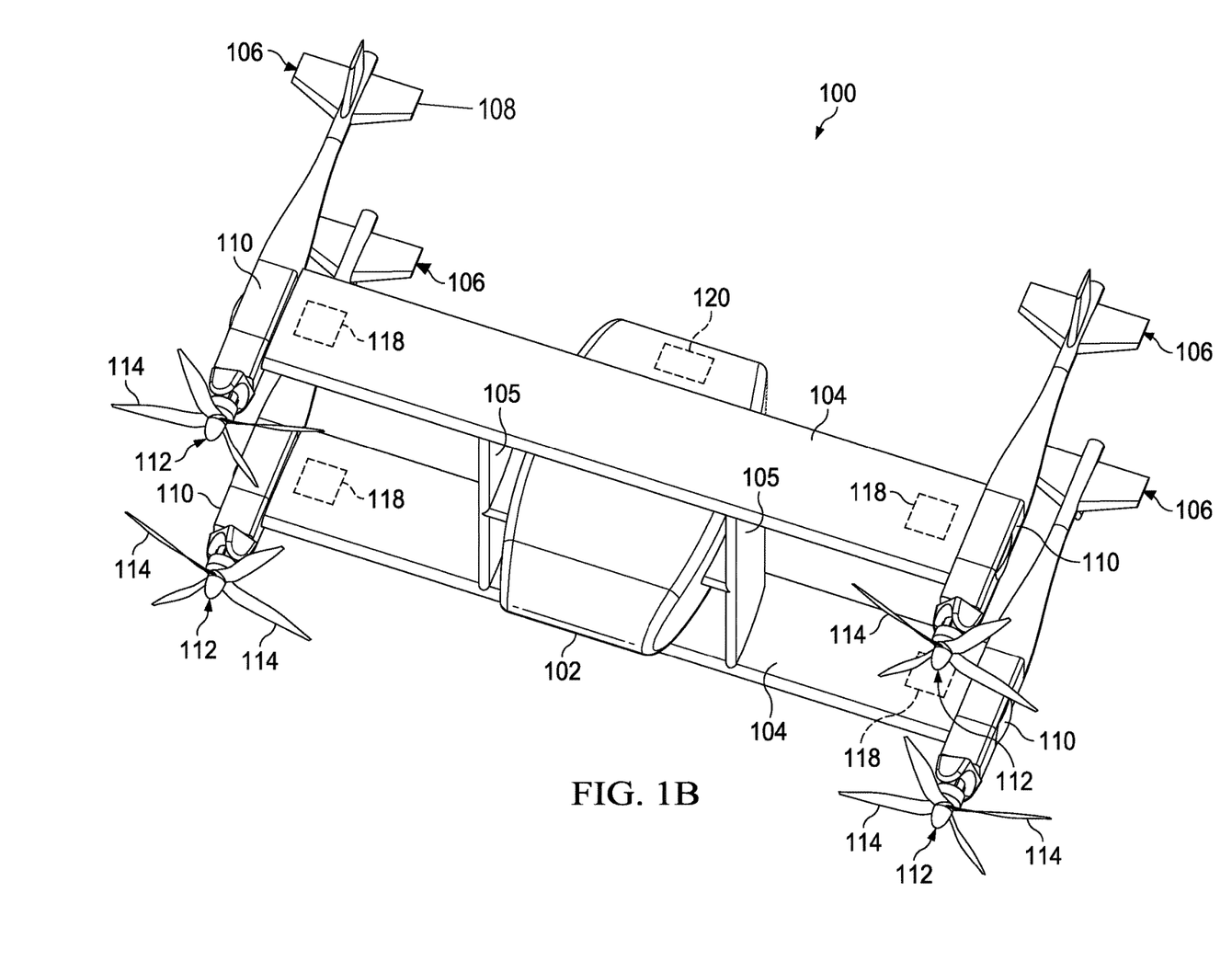

Referring now to FIGS. 1A-1B, FIGS. 1A-1B illustrate example embodiments of an example aircraft 100, which in these examples is generally configured as a VTOL aircraft. More specifically, aircraft 100 may be an autonomous pod transport ("APT") convertible drone-type aircraft (discussed in further detail below) that is operable in different flight modes including a helicopter mode (as shown in FIG. 1A) and an airplane mode (as shown in FIG. 1B). In helicopter mode, aircraft 100 may be capable of various flight maneuvers including, but not limited to, vertical takeoff from and landing to one or more landing zone(s), hover, and/or sideward and rearward mobility or flight. In airplane mode, aircraft 100 may be capable of forward flight maneuvers. Additionally, since aircraft 100 is a convertible aircraft, it is also operable in a conversion, or transition, mode when transitioning between the helicopter and airplane modes.

As previously noted, unlike fixed-wing aircraft, VTOL aircraft do not require runways. Instead, VTOL aircraft are capable of taking off, hovering, and landing vertically. As also noted above, helicopters and tiltrotors are examples of VTOL aircraft. Yet another type of VTOL aircraft is commonly referred to as a "tail-sitter" aircraft. As the name implies, a tail-sitter aircraft takes off and lands on its tail, but tilts horizontally for forward flight. As illustrated in the embodiments of FIGS. 1A-1B, aircraft 100 is configured as a tail-sitter aircraft. Being a drone-type aircraft, aircraft 100 may be configured for remote control and operation. Additionally, at least in some embodiments, aircraft 100 may be fully autonomous and self-directed via a predetermined or preprogrammed location-based guidance system (e.g., global positioning system (GPS), coordinate-based location, street address, etc.).

In at least one embodiment, aircraft 100 may include a cargo pod 102 that functions as the fuselage, wings 104, vertical supports 105 disposed between the wings 104, tail booms 106, and a plurality of pylons 110 each comprising a rotor system 112 having a plurality of rotor blades 114. Each combination of a pylon 110 and its associated rotor system 112 comprising rotor blades 114 may be referred to herein as a propulsion assembly 115. Aircraft 100 may also include plurality of aircraft sensors 118 and a flight control system 120. Wings 104 comprise a substantially parallel, double-wing (sometimes referred to as "biplane") configuration that provides lift to the aircraft 100 during forward flight (e.g., as shown in FIG. 1B) while also maintaining a smaller footprint of the aircraft 100 when the aircraft 100 is on the ground. Vertical supports 105 are disposed on each side of the cargo pod 102 and affixed between the wings 104 to provide structure and support to the wings 104. The cargo pod 102 is generally positioned between the wings 104 and the vertical supports 105. In the embodiment shown, the cargo pod 102 is affixed to the vertical supports 105. However, in other embodiments, the cargo pod 102 may be affixed to the wings 104 or both the wings 104 and vertical supports 105. Additionally, while two vertical supports 105 are shown, in some embodiments, aircraft 100 may comprise more vertical supports 105 depending on the configuration of the aircraft 100.

Tail booms 106 are disposed on the outboard ends of each wing 104. The tail booms 106 also double as a landing gear or landing struts for the aircraft 100. Tail boom 106 comprises stabilizers 108. Stabilizers 108 function to provide stabilization to the aircraft 100 during forward flight in a manner substantially similar as stabilizers known in the art. Pylons 110 are disposed on outboard sides of each tail boom 106 proximate the outboard end of each wing 104. Each pylon 110 comprises a selectively rotatable rotor system 112 having a plurality of rotor blades 114 coupled thereto. In the embodiment shown, each rotor system 112 is driven by an associated electric motor (not shown) within each pylon 110. However, in other embodiments, the rotor systems 112 may be driven by a combustion engines or auxiliary power unit through a plurality of interconnect driveshafts and/or auxiliary gearboxes, which may be housed within any portion of an aircraft (e.g., within a pylon, fuselage, combinations thereof, or the like). Furthermore, since aircraft 100 functions as a convertible aircraft, the rotational speeds of each rotor system 112 may be selectively controlled to orient aircraft 100 in the various flight modes.

In various embodiments, flight control system 120 may include one or more processor(s), memory element(s), network connectivity device(s), storage, input/output (I/O) device(s), combinations thereof, or the like to facilitate operations of each propulsion assembly 115 and/or other electronic systems of aircraft 100. In various embodiments, operation of each propulsion assembly 115 may include controlling the rotational speed of rotor systems 112, adjusting thrust vectors of rotor systems 112, and the like to facilitate vertical lift operations, forward thrust operations, transition operations, combinations thereof, or the like for aircraft 100. In some embodiments, feedback may be received by flight control system 120 (e.g., via each propulsion assembly 115, one or more sensors 118, etc.) to facilitate or augment various operations of aircraft 100. In various embodiments, sensors 118 may include, but not be limited to, positioning sensors, attitude sensors, speed sensors, environmental sensors, fuel sensors, temperature sensors, location sensors, combinations thereof, or the like.

When aircraft 100 is in a helicopter mode position, rotor systems 112 may provide a vertical lifting thrust for aircraft 100, which may enable hover flight operations to be performed by aircraft 100. When aircraft 100 is in an airplane mode position, rotor systems 112 may provide a forward thrust and a lifting force may be supplied by wings 104.

Example embodiments associated with thrust vectoring of propulsion assemblies are described below with more particular reference to the remaining FIGURES. It should be appreciated that example aircraft 100 of FIGS. 1A-1B is merely illustrative of a variety of aircraft in which a remote control system providing active feedback may be used in accordance with embodiments of the present disclosure. Other aircraft in which thrust vectoring of propulsion assemblies may be used can include, for example, fixed-wing airplanes, hybrid aircraft, unmanned aircraft, a variety of helicopter configurations, and drones, among other examples.

Figure 2A:
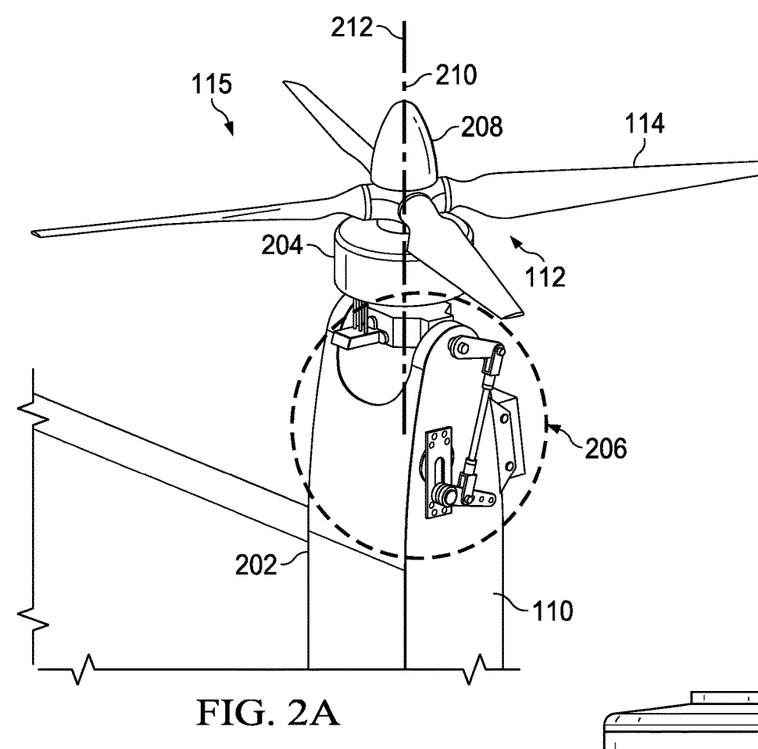
FIGS. 2A-2B are simplified diagrams illustrating example details of a propulsion assembly for an aircraft in accordance with embodiments described herein.
Figure 2B:
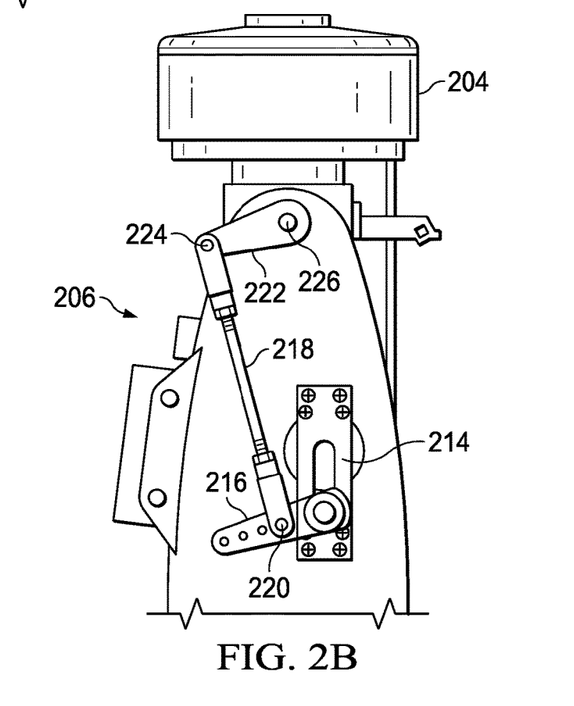

FIGS. 2A-2B illustrate details of propulsion assembly 115. Propulsion assembly 115 includes a nacelle 202, an engine 204, a drive system 206, a rotor hub 208 and a rotor system 112. In the event of a motor failure, flight control system 120 can engage drive system 206 to change a rotor axis 210 of rotor system 112 and achieve thrust vectoring. As used herein, the "rotor axis" comprises a centerline of rotor system 112 around which rotor blades 114 rotate. Rotor axis 210 is a resultant of three orthogonal components: pitch axis (nose up or down), yaw axis (nose left or right), and roll axis (rotation about centerline) of rotor system 112. In some operational states, rotor axis 210 may coincide with centerline 212 of pylon 110, which is parallel to the longitudinal axis of aircraft 100 in forward flight configuration (e.g., FIG. 1B). In other operational states, rotor axis 210 may diverge from centerline 212 of pylon 110. In a general sense, thrust vectoring is the ability of an aircraft, rocket, or other vehicle to manipulate the direction of the thrust from its engine(s) or motor(s) to control the attitude or angular velocity of the vehicle.

In various embodiments described herein, the thrust vectoring of aircraft 100 may be achieved using gimbaled thrust by swiveling rotor system 112 on one or more orthogonal axes (e.g., pitch and yaw), effectively changing rotor axis 210. Changing rotor axis 210 can enable a shift in center of gravity (CG) of aircraft 100 vertically and laterally, which may be useful when one engine fails, a condition called OEI. In the OEI condition, changing the CG by rotating rotor axis 210 may reduce a thrust requirement on the remaining working engines from 50% of vehicle weight to 42% in some embodiments. Reducing thrust requirements thus can also reduce the cost, size, and weight of propulsion system 115 when being sized for this OEI condition. Aircraft 100 can use three of its remaining engines to hover in the OEI condition without being rendered unstable by shifting its CG with the change in rotor axis 210. Such configuration may also allow for forward/aft and side to side translation without changing attitude. Aircraft 100 can also rotate to lowest drag orientation in hover and use thrust vectoring to hold position in wind without attitude change by rotating rotor axis 112.

Drive system 206 is shown in greater detail in FIG. 2B. In various embodiments, drive system 206 is attached to pylon 110. In various embodiments, a servo actuator 214 is configured to move a servo arm 216 from a first position to a second position upon command from flight control system 120. A control rod 218 is configured to translate by a fixed distance corresponding to movement of servo arm 216 from the first position to the second position. Control rod 218 is coupled to servo arm 216 at one end by a first joint 220 and to a control arm 222 at an opposing end by a second joint 224. Control arm 222 is configured to swivel by an angle about a pivot axis 226 corresponding to translation of control rod 218 by the fixed distance. Rotor system 112, coupled to control arm 222 at pivot axis 226, is configured to correspondingly swivel by the angle about pivot axis 226 from a first position to a second position. Rotor axis 210 changes from a first orientation to a second orientation corresponding to swiveling rotor system 112 about pivot axis 226 from the first position to the second position. The change of the rotor axis to the second orientation is configured to correspondingly change a direction of thrust on the vehicle by propulsion assembly 115.

Features of drive system 206 described above may be embodied in various ways. In one embodiment, when one engine fails and renders its respective propulsion assembly inoperative, an OEI mode may be detected and/or activated. Thereupon, flight control system 120 may engage an OEI mode of propulsion assembly 115. In the OEI mode, servo actuator 214 of drive system 206 is activated by flight control system 120. In some embodiments, servo actuator 214 may translate linearly along a direction parallel to centerline 212 of pylon 110. The amount of translation may be in response to the command received from flight control system 120. In some embodiments, flight control system 120 may command servo actuator 214 to move a certain distance. In other embodiments, flight control system 120 may command servo actuator 214 to move from a position x to a position y. In some embodiments, servo actuator 214 may comprise a servomotor that may be configured to rotate by a certain amount in response to a command from flight control system 120. In contrast to a regular motor that rotates continuously and halts only when it is turned off, the servomotor can stop at any required position and hold it until it receives another command.

In some embodiments, the extent of movement (e.g., translation or rotation) of servo actuator 214 may be calculated in situ by flight control system 120 based on predetermined inputs and detected environmental and operational conditions. For example, flight control system 120 may activate servo actuator 214 when OEI is detected upon failure of a particular engine of vehicle 100, and the extent of movement of servo actuator 214 may be calculated based on the location of the particular engine that has failed. In such a case, the relative locations of the vehicle's engines may be among the predetermined inputs to flight control system 120. In another example, flight control system 120 may detect headwind of a certain magnitude. In such a case, the extent of movement of servo actuator 214 may be calculated to maintain a translation direction of vehicle 100 without change in attitude in the presence of the headwind and may be based on feedback from various sensors and other components of vehicle 100. In other embodiments, the extent of movement (e.g., translation or rotation) of servo actuator 214 may be preconfigured into flight control system 120 for various operational modes. For example, in OEI mode, servo actuator 214 may be commanded to move by a certain extent; in a headwind mode, servo actuator 214 may be commanded to move by a different extent, and so on. Any appropriate configuration of flight control system 120 that can generate a command to move servo actuator 214 by a controlled amount may be used within the broad scope of the present disclosure.

In various embodiments, servo actuator 214 is rigidly coupled to servo arm 216 so that there is no relative movement between servo arm 216 and servo actuator 214. For example, in embodiments in which servo actuator 214 translates linearly in a direction parallel to centerline 212 of pylon 110, servo arm 216 may also translate correspondingly. In another example, in embodiments in which servo actuator 214 rotates in response to a command from flight control system 120, servo arm 216 may rotate correspondingly.

Servo arm 216 may be coupled to a control rod 218 by a joint 220 such that linear or rotary movement of servo arm 216 transforms to linear translation of control rod 218 correspondingly. For example, servo arm 216 may comprise a plurality of holes and control rod 218 may be attached at one end with a bolt to any one of the plurality of holes in servo arm 216 based on dimensions and tolerances of the various parts of drive system 206. Any other coupling mechanism, such as welding, may also be used within the broad scope of the present disclosure.

Control arm 222 may be coupled to control rod 218 at its one end using any suitable coupling means, including bolts or welds. Control arm 222 may be configured to swivel about pivot axis 226 at its opposing end such that linear translation of control rod 218 is configured to swivel control arm 222 about motor pivot axis 226. In various embodiments, control arm 222 is rigidly coupled to rotor system 112 such that swiveling of control rod 218 may be configured to swivel rotor system 112 correspondingly by the same angle about pivot axis 226, thereby changing rotor axis 210 and a direction of thrust on the vehicle when rotors 114 rotate around rotor axis 210. Pylon 110 can be constructed (e.g., shaped) suitably such that the orientation of pivot axis 226 in relation to the rest of aircraft 100, for example, to a lateral axis of aircraft 100, can enable appropriate thrust vectoring of aircraft 100 with the change in orientation of rotor axis 210 during operation. In an example embodiment, pylon 110 may be configured such that pivot axis 216 is fixed perpendicular to centerline 212 of pylon 210 at a lateral angle relative to a lateral axis of the vehicle.

Figure 3:
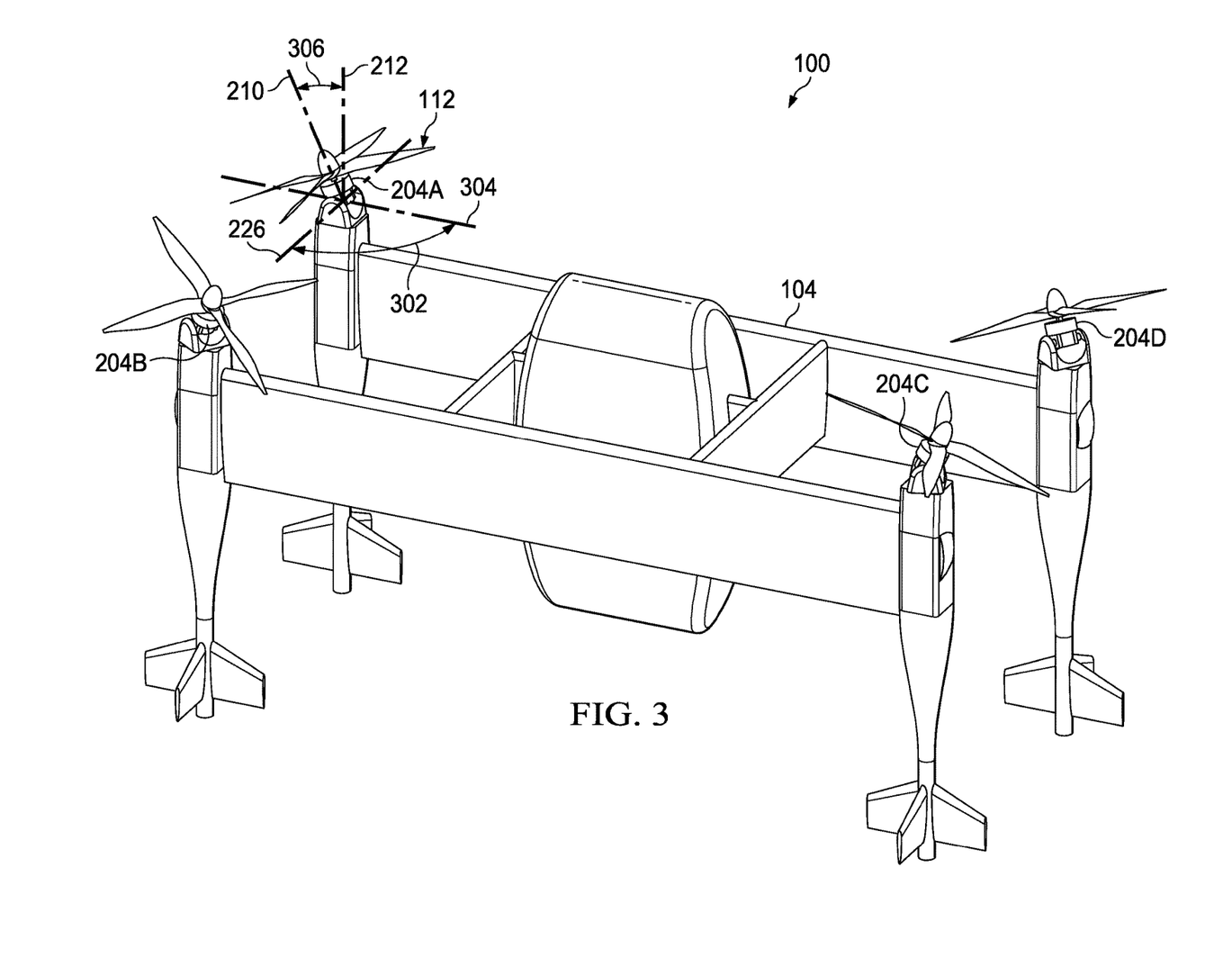
FIG. 3 is a schematic diagram of an embodiment of an aircraft according to this disclosure.

FIG. 3 illustrates details of propulsion assembly 115 in aircraft 100 according to embodiments of the present disclosure. Pivot axis 226 may be fixed at a pivot axis angle 302 with respect to lateral axis 304 in a plane defined by a longitudinal axis (also called roll axis in the forward flight configuration of FIG. 1B) of aircraft 100. For example, centerline 212 of pylon 110 is parallel to the longitudinal axis. Lateral axis 304 (also called pitch axis in the configuration of FIG. 1B) is perpendicular to the longitudinal axis and parallel to wings 104. Pivot axis angle 302 is fixed prior to operation of aircraft 100. In other words, pylon 110 is designed (e.g., shaped, formed, manufactured, configured, etc.) such that pivot axis angle 302 is oriented thus with respect to lateral axis 304 and centerline 212 of pylon 110 so that rotor system 112 can swivel about pivot axis 226 appropriately. In some embodiments, pivot axis 226 of each rotor system 115 may be oriented at the same value of pivot axis angle 302 relative to lateral axis 304 (or wing 104). In some embodiments, pivot axis 226 of each rotor system 115 may be oriented at different values of pivot axis angle 302 relative to lateral axis 304 (or wing 104).

During operation, flight control system 120 is configured to activate a particular operational mode of propulsion assembly 115. In some embodiments, the particular operational mode may comprise the OEI mode. In other embodiments, the particular operational mode may comprise headwind mode, as described further below with respect to FIGS. 6A-6B. In the particular operational mode, rotor system 112 may swivel around pivot axis 226 to change rotor axis 210 from centerline 212 by a gimbal angle 306. The amount of swivel, characterized by gimbal angle 306 is preconfigured for the particular operational mode in some embodiments. For example, gimbal angle 306 may be based on the size, weight and other parameters of aircraft 100, in view of the particular engine that has failed and triggered the OEI condition. If engine 204A fails, gimbal angle 306 may be a first value; if engine 204B fails, gimbal angle 306 may be a second value; if engine 204C fails, gimbal angle 306 may be a third value; and if engine 204D fails, gimbal angle 306 may be a fourth value. First value, second value, third value and fourth value may be different from each other in some embodiments. In some embodiments, all four rotor systems 112 may be rotated by the same gimbal angle 306; in other embodiments, each rotor system 112 may be rotated by different gimbal angles 306, for example, depending on its respective pivot axis angle 302 with lateral axis 304.

Figure 4A:
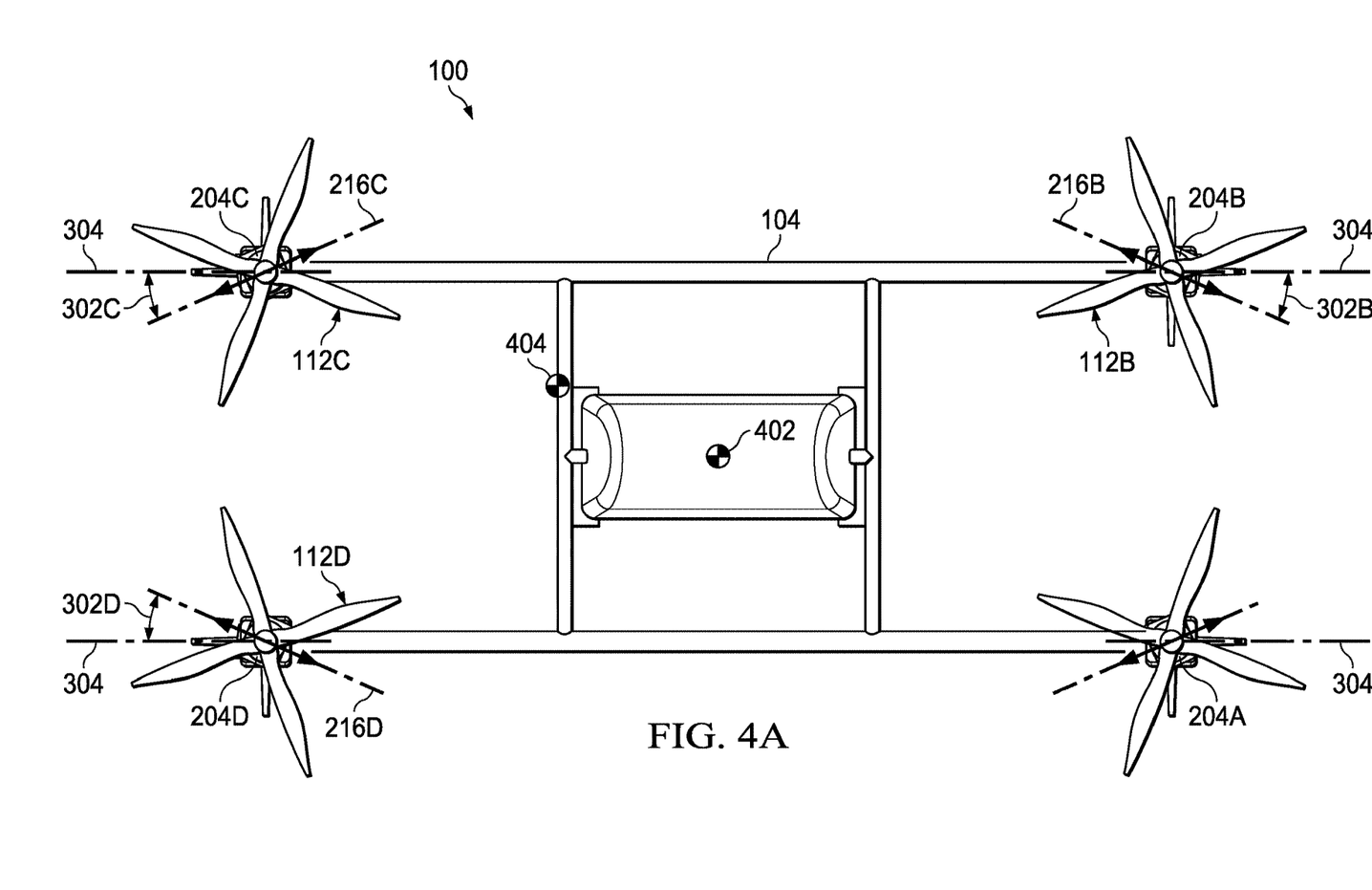
FIGS. 4A-4C are simplified diagrams illustrating various operational aspects of an example aircraft according to embodiments of this disclosure.
Figure 4B:
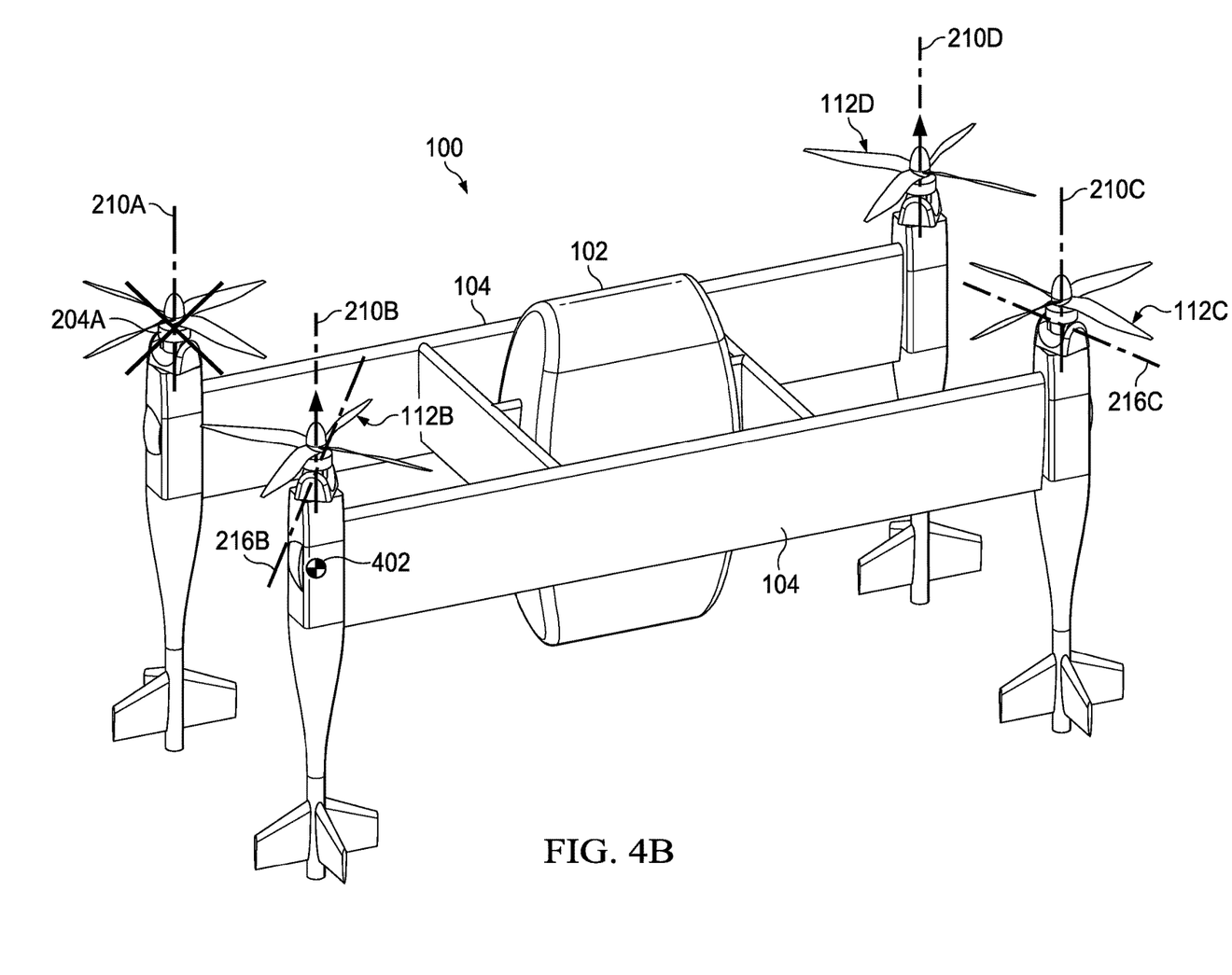
Figure 4C:
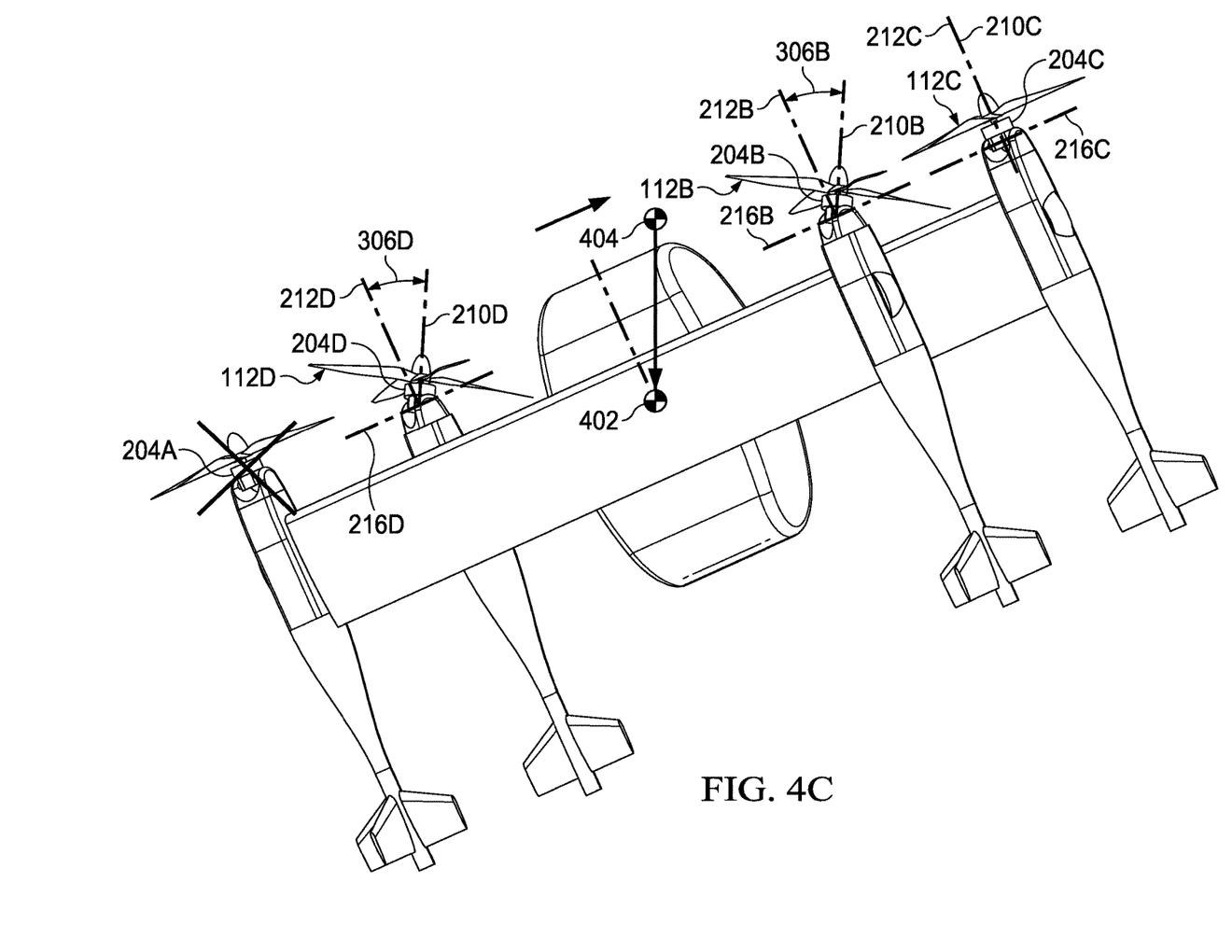

FIGS. 4A-4C depict operational attitudes of aircraft 100 in the OEI mode according to some embodiments of the present disclosure. As shown in FIG. 4A, when all engines are operational, the effective CG of aircraft 100 may be at position 402. Assume an OEI mode in which engine 204A fails. Under this OEI mode, rotor systems 112B, 112C and 112D may be pivoted by respective gimbal angles 306B, 306C and 306D (not shown in FIG. 4A because they are out of the plane of the illustration) to change their respective rotor axes 210B, 210C and 210D (not shown in FIG. 4A because they are out of the plane of the illustration), to move the effective CG of aircraft 100 from position 402 to position 404, which may be equidistant from the remaining three operational engines 204B, 204C and 204D. In various embodiments, respective gimbal angles 306B, 306C and 306D may vary according to respective pivot axis angles 302B, 302C and 302D.

FIG. 4B depicts a condition of aircraft 100 after engine 204A fails, but before rotor axis 210B, 210C and 210D of respective operational engines 204B, 204C and 204D are swiveled around respective pivot axes 216B, 216C and 216D (216D is not shown in FIG. 4B so as not to clutter the drawing). In this position, two engines (e.g., 204B and 204D) support the CG of aircraft 100 at position 402 if gimbal angle 306 is not vectored appropriately; third engine (e.g., 204C) runs idle without supporting any weight.

FIG. 4C depicts a condition of aircraft 100 after engine 204A fails and after rotor systems 112B, 112C and 112D of respective operational engines 204B, 204C and 204D are swiveled around respective pivot axes 216B, 216C and 216D. Gimbal angles 306B (i.e., angle between axes 210B and 212C), 306C (i.e., angle between axes 210C and 212C), and 306D (i.e., angle between axes 210D and 212D) may be configured to move the CG of aircraft 100 from first position 402 to second position 404. Swiveling rotor systems 112B, 112C and 112D also enables equalizing thrust on critically loaded engines, for example, engines 112B and 112D in the example shown. In the embodiment shown in the figure, only rotor systems 112B and 112D are swiveled so that their respective gimbal angles 306B and 306D are non-zero, whereas rotor system 112C is maintained without any rotation of its rotor axis 210C so that its gimbal angle 306C is zero. Various other configurations are also possible based on the respective load bearing capacities of various engines 204 and other parameters of aircraft 100. The configuration results in thrust vectoring that tilts aircraft 100 (e.g., around its yaw axis), moving the effective CG to new position 404 such that aircraft 100 hovers in this tilted attitude with three operational engines 204B, 204C and 204D taking on equal load. In some embodiments, the tilted attitude may comprise an effective movement around two orthogonal axes of aircraft 100, for example, roll axis (longitudinal axis) and yaw axis (vertical axis), or pitch axis (lateral axis) and yaw axis, or roll axis and pitch axis.

Figure 5:
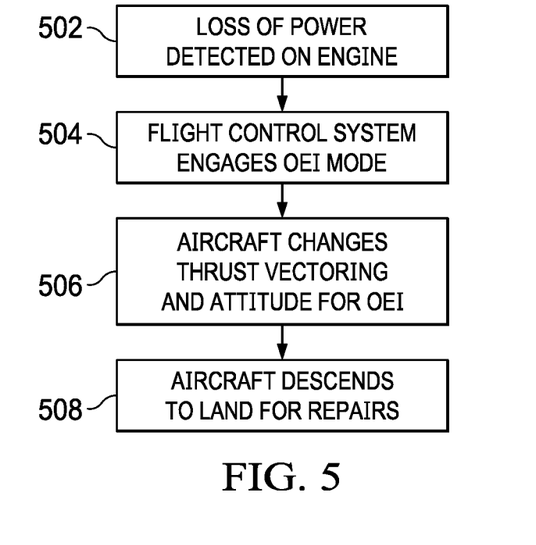
FIG. 5 is a flow diagram illustrating operation of controllable vectored thrust in propulsion assemblies in accordance with embodiments described herein.

FIG. 5 is a flow diagram showing a method for controllable vectored thrust in propulsion assemblies according to various embodiments of the present disclosure. At 502, a change in operational state, such as loss of power, is detected on one of the engines, for example, 204A. At 504, flight control system 120 engages OEI mode. In various embodiments, in the OEI mode, servo actuator 214 of drive system 206 of remaining operational engines 204B, 204C and 204D may be activated independently. At 506, aircraft 100 changes thrust vectoring and attitude for OEI. In various embodiments, activation of servo actuator 214 may cause respective servo arm 216 of drive system 206 of remaining operational engines 204B, 204C and 204D to rotate. Rotating servo arm 216 may cause control rod 218 to translate accordingly, causing control arm 222 to pivot around pivot axis 226. Rotation of control rod 218 may cause rotor system to rotate around pivot axis 226, changing rotor axis 210 accordingly, resulting in change of thrust vectoring and attitude. In various embodiments, changing thrust vector and attitude may comprise changing the CG of aircraft 100 from a first CG position (e.g., 402) to a second CG position (2.g., 404). In various embodiments, changing thrust vector and attitude may comprise adjusting rotor system 112 of propulsion assembly 115 of aircraft 100 from a first position to a second position, for example, wherein rotor axis 210 forms gimbal angle 306 between the first position and the second position. At 508, aircraft 100 descends to land for repairs.

Figure 6A:
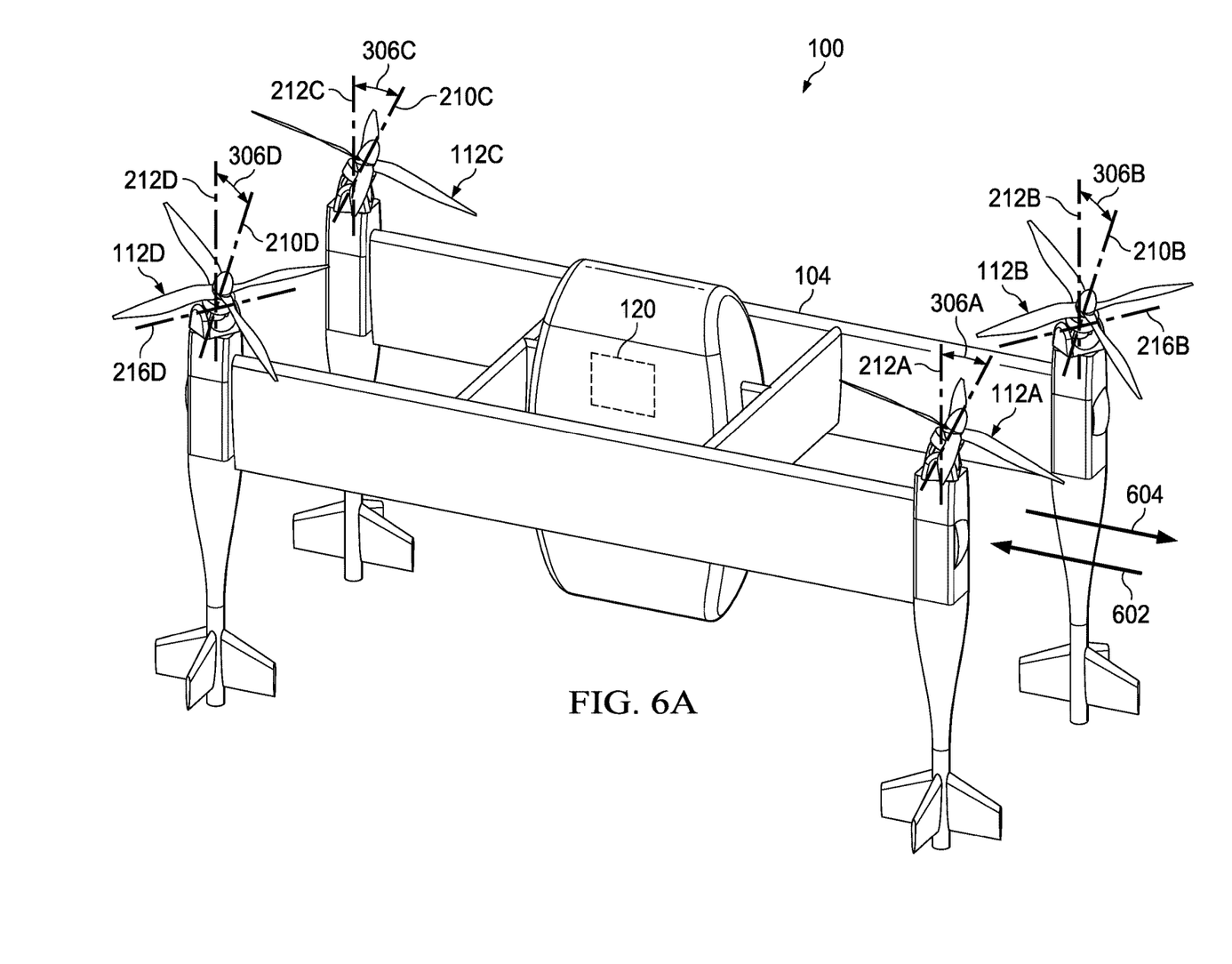
FIGS. 6A-6B are schematic diagrams of various operational aspects of an example aircraft according to embodiments of this disclosure.
Figure 6B:
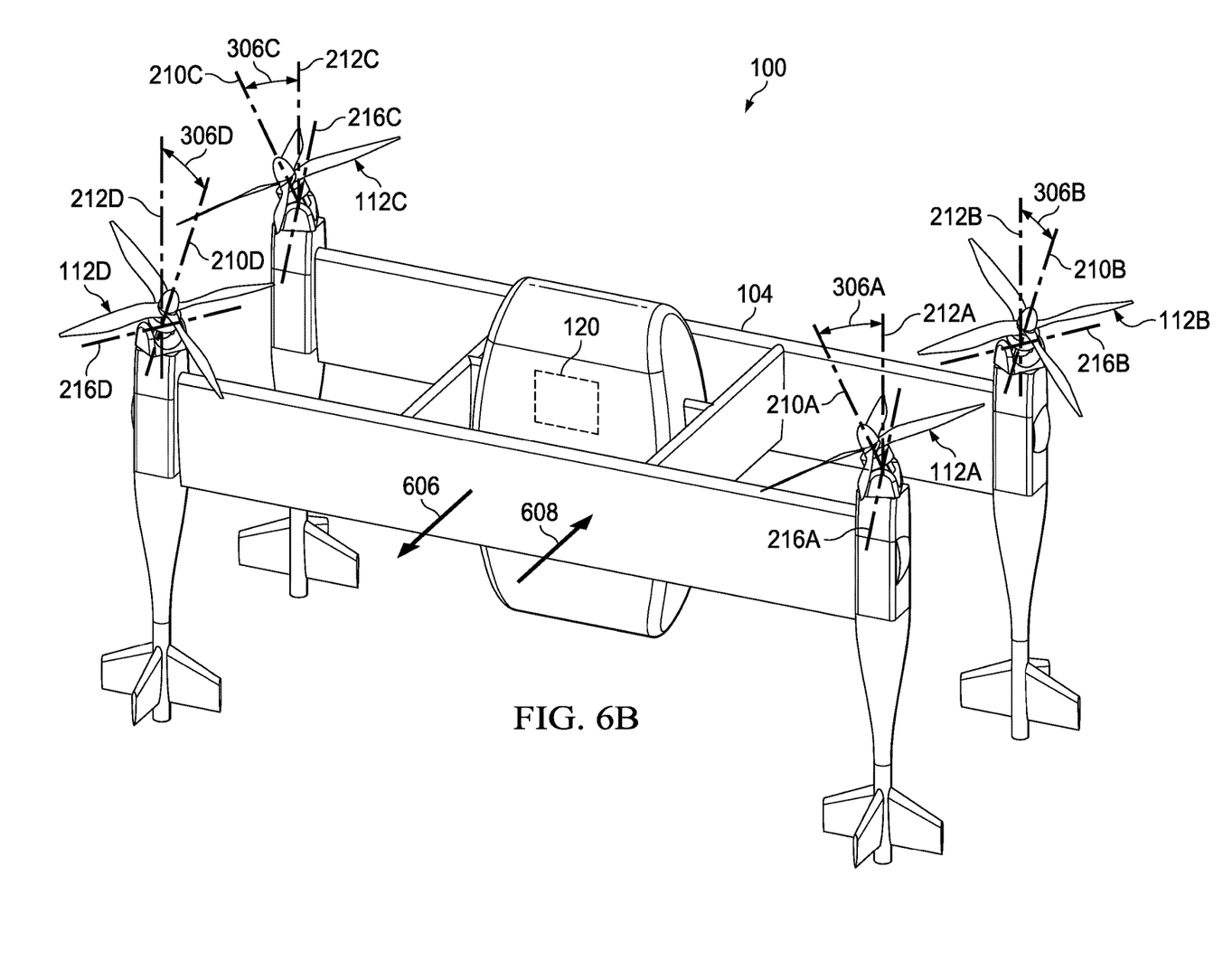

FIGS. 6A-6B is an oblique view of aircraft 100 depicting operation in hover mode in the presence of headwind forces acting thereon. In various embodiments, aircraft 100 can translate in a direction 602 along a lateral axis (e.g., 304) of aircraft 100 without changing attitude in any direction by orienting rotor axis 210 suitably, moving or counteracting headwind forces that are acting parallel to 602 in an opposing direction 604. Gimbal angles 306A, 306B, 306C and 306D of individual rotor systems 112A, 112B, 112C and 112D may be suitably independently configured during operation by flight control system 120 to enable aircraft 100 to translate in direction 602 without changing attitude.

FIG. 6B shows translation in a direction 606 orthogonal to the lateral axis (e.g., 304) of aircraft 100 in the presence of headwinds in a direction 608 that is parallel but opposite to direction 606. Gimbal angles 306A, 306B, 306C and 306D of individual rotor systems 112A, 112B, 112C and 112D may be suitably independently manipulated during operation by flight control system 120 to enable aircraft 100 to translate in direction 606 without changing attitude.

Figure 7:
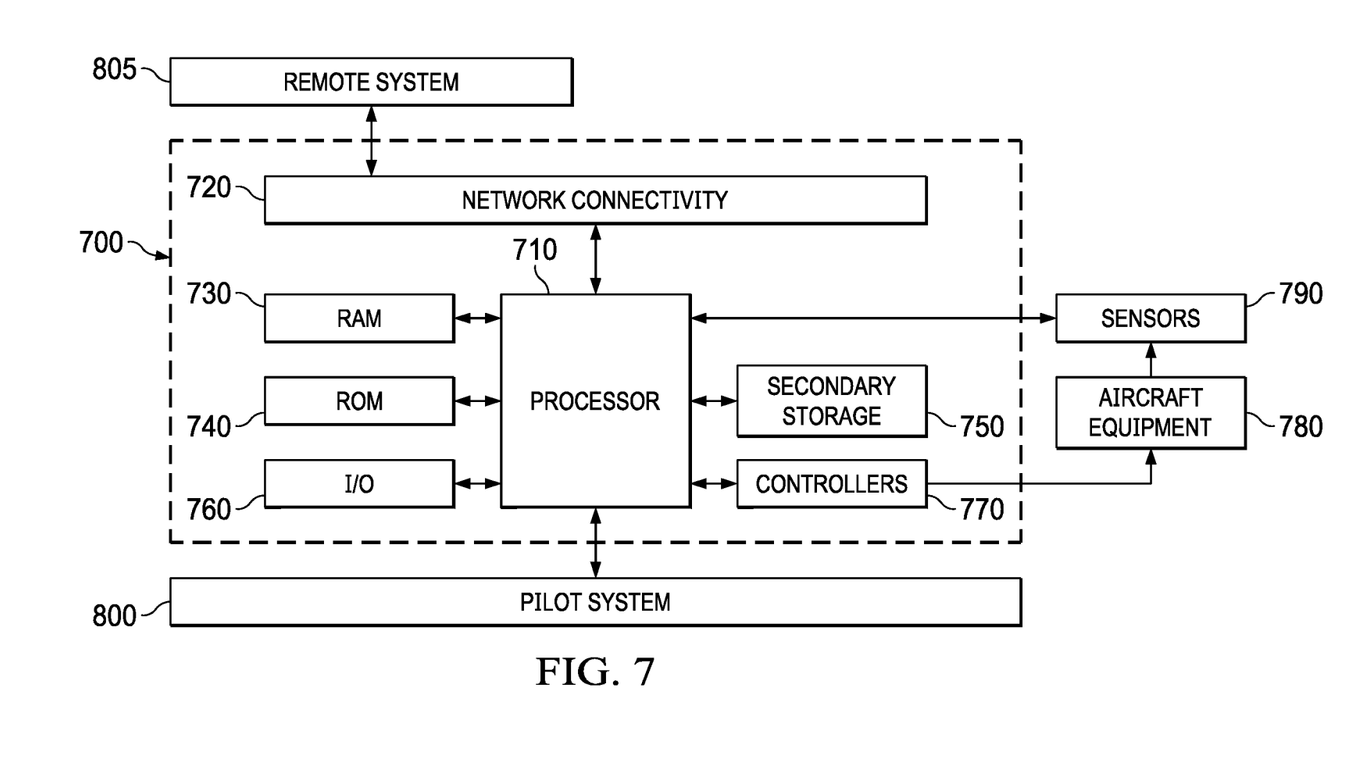
FIG. 7 is a schematic diagram of a general-purpose processor (e.g. electronic controller or computer) system suitable for implementing the embodiments of this disclosure.

FIG. 7 illustrates a schematic diagram of a general-purpose processor (e.g. electronic controller or computer) system 700 suitable for implementing the embodiments of this disclosure. System 700, which may be characterized as a flight control system (e.g., 120), includes a processor 710 suitable for implementing one or more embodiments disclosed herein. In addition to processor 710 (which may be referred to as a central processor unit (CPU), system 700 may include network connectivity devices 720, random-access memory ("RAM") 730, read only memory ("ROM") 740, secondary storage 750, and input/output (I/O) devices 760. System 700 may also comprise aircraft component controllers 770 for generating control signals to aircraft equipment 780 (e.g., propulsion assemblies 115 and/or control assemblies including control surfaces) in accordance with the teachings of embodiments described herein. Sensors 790 are also provided and provide sensor data to be processed by processor 710. In some cases, some of these components may not be present or may be combined in various combinations with one another or with other components not shown. These components might be located in a single physical entity or in more than one physical entity. Any actions described herein as being taken by processor 710 might be taken by processor 710 alone or by processor 710 in conjunction with one or more components shown or not shown in system 700. It will be appreciated that the data and lookup tables described herein may be stored in memory (e.g., RAM 730, ROM 740) and/or in one or more databases comprising secondary storage 750.

Processor 710 executes instructions, codes, computer programs, or scripts that it might access from network connectivity devices 720, RAM 730, ROM 740, or secondary storage 750 (which might include various disk-based systems such as hard disk, floppy disk, optical disk, or other drive). While only one processor 710 is shown, multiple processors may be present. Thus, while instructions may be discussed as being executed by processor 710, the instructions may be executed simultaneously, serially, or otherwise by one or multiple processors 710. Processor 710 may be implemented as one or more CPU chips and/or application specific integrated chips (ASICs).

Network connectivity devices 720 may take the form of modems, modem banks, Ethernet devices, universal serial bus ("USB") interface devices, serial interfaces, token ring devices, fiber distributed data interface ("FDDI") devices, wireless local area network ("WLAN") devices, radio transceiver devices such as code division multiple access ("CDMA") devices, global system for mobile communications ("GSM") radio transceiver devices, worldwide interoperability for microwave access ("WiMAX") devices, and/or other well-known devices for connecting to networks. These network connectivity devices 720 may enable processor 710 to communicate with the Internet or one or more telecommunications networks or other networks from which processor 710 might receive information or to which processor 710 might output information.

Network connectivity devices 720 might also include one or more transceiver components capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component might include separate receiving and transmitting units or a single transceiver. Information transmitted or received by the transceiver may include data that has been processed by processor 710 or instructions that are to be executed by processor 710. Such information may be received from and outputted to a network in the form, for example, of a computer data baseband signal or signal embodied in a carrier wave. The data may be ordered according to different sequences as may be desirable for either processing or generating the data, transmitting or receiving the data, and/or controlling the aircraft 100. The baseband signal, the signal embedded in the carrier wave, or other types of signals currently used or hereafter developed may be referred to as the transmission medium and may be generated according to several methods well-known to one skilled in the art.

RAM 730 might be used to store volatile data and perhaps to store instructions that are executed by processor 710. ROM 740 is a non-volatile memory device that typically has a smaller memory capacity than the memory capacity of secondary storage 750. ROM 740 might be used to store instructions and perhaps data that are read during execution of the instructions. Access to both RAM 730 and ROM 740 is typically faster than to secondary storage 750. Secondary storage 750 is typically comprised of one or more disk drives, tape drives, or solid-state drives and might be used for non-volatile storage of data or as an over-flow data storage device if RAM 730 is not large enough to hold all working data. Secondary storage 750 may be used to store programs or instructions that are loaded into RAM 730 when such programs are selected for execution or information is needed.

I/O devices 760 may include liquid crystal displays (LCDs), touchscreen displays, keyboards, keypads, switches, dials, mice, track balls, voice recognizers, card readers, paper tape readers, printers, video monitors, transducers, sensors 790, motor drive electronics, or other well-known input or output devices, such a cyclic control, collective control, and pedal inputs used by a pilot, co-pilot, or remote pilot. Some or all of I/O devices 760 may be substantially similar to various components disclosed herein and/or may be components of any of the control systems and/or other electronic systems disclosed herein.

It is to be understood by those skilled in the art that system 700 may be implemented in a variety of forms including hardware, software, firmware, special purpose processors and combinations thereof, and may comprise an autonomous flight system. System 700 may receive input from a variety of sources including on-board sources such as sensors 790 and a pilot system 800, which in certain embodiments may comprise an autonomous pilot ("auto-pilot") system, as well as external sources such as a remote system 805, GPS satellites or other location positioning systems and the like. For example, system 700 may receive a flight plan including starting and ending locations for a mission from pilot system 800 and/or remote system 805. Thereafter system 700 is operable to autonomously control all aspects of flight of an aircraft of the present disclosure.

For example, during the various operating modes of aircraft 100 including vertical takeoff and landing mode, hover flight mode, forward flight mode, and transitions therebetween, commands are provided to controllers 770, which enable independent operation of each propulsion assembly 115 including, for example, controlling gimbal angle 306 of rotor axis 210, rotational speed of rotor systems 112, changing pitch of rotor blades 114, adjusting the thrust vectors and the like. In addition, these commands enable transition of aircraft 100 between a vertical lift orientation and a forward thrust orientation. Feedback may be received from controllers 770 and each propulsion assembly 115. This feedback is processed by processor 710 and can be used to supply correction data and other information to controllers 770. Sensors 790, such as positioning sensors, attitude sensors, speed sensors, environmental sensors, fuel sensors, temperature sensors, location sensors and the like, also provide information to further enhance autonomous control capabilities.

Some or all of the autonomous control capability of system 700 can be augmented or supplanted by a remote flight control system, such as remote system 805. Remote system 805 may include one or computing systems that may be implemented on general-purpose computers, special purpose computers or other machines with memory and processing capability. For example, the computing systems may include one or more memory storage modules including, but is not limited to, internal storage memory such as random-access memory, non-volatile memory such as read only memory, removable memory such as magnetic storage memory, optical storage memory, solid-state storage memory or other suitable memory storage entity. The computing systems may be microprocessor-based systems operable to execute program code in the form of machine-executable instructions. In addition, the computing systems may be connected to other computer systems via a proprietary encrypted network, a public encrypted network, the Internet or other suitable communication network that may include both wired and wireless connections. The communication network may be a local area network, a wide area network, the Internet, or any other type of network that couples a plurality of computers to enable various modes of communication via network messages using as suitable communication techniques, such as transmission control protocol/internet protocol, file transfer protocol, hypertext transfer protocol, internet protocol security protocol, point-to-point tunneling protocol, secure sockets layer protocol or other suitable protocol. Remote system 805 may communicate with flight control system 700 via network connectivity devices 720 using include both wired and wireless connections.

Remote system 805 preferably includes one or more flight data display devices configured to display information relating to one or more aircraft of the present disclosure. Display devices may be configured in any suitable form, including, for example, LCDs, light emitting diode displays, cathode ray tube displays or any suitable type of display. Remote system 805 may also include audio output and input devices such as a microphone, speakers and/or an audio port allowing an operator to communicate with, for example, a pilot on board aircraft 100. The display device may also serve as a remote input device if a touch screen display implementation is used, however, other remote input devices, such as a keyboard or joysticks, may alternatively be used to allow an operator to provide control commands to an aircraft being operated responsive to remote control.

Some or all of the autonomous and/or remote flight control of an aircraft of the present disclosure can be augmented or supplanted by onboard pilot flight control from pilot system 800. Pilot system 800 may be integrated with system 700 or may be a standalone system preferably including a non-transitory computer readable storage medium including a set of computer instructions executable by a processor and may be implemented by a general-purpose computer, a special purpose computer or other machine with memory and processing capability. Pilot system 800 may include one or more memory storage modules including, but is not limited to, internal storage memory such as random-access memory, non-volatile memory such as read only memory, removable memory such as magnetic storage memory, optical storage memory, solid-state storage memory or other suitable memory storage entity. Pilot system 800 may be a microprocessor-based system operable to execute program code in the form of machine-executable instructions. In addition, pilot system 800 may be connectable to other computer systems via a proprietary encrypted network, a public encrypted network, the Internet or other suitable communication network that may include both wired and wireless connections. Pilot system 800 may communicate with system 700 via a communication channel that preferably includes a wired connection.

The diagrams in the FIGURES illustrate the architecture, functionality, and/or operation of possible implementations of various embodiments of the present disclosure. Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

One or more advantages mentioned herein do not in any way suggest that any one of the embodiments described herein necessarily provides all the described advantages or that all the embodiments of the present disclosure necessarily provide any one of the described advantages. Note that in this Specification, references to various features included in "one embodiment", "example embodiment", "an embodiment", "another embodiment", "certain embodiments", "some embodiments", "various embodiments", "other embodiments", "alternative embodiment", and the like are intended to mean that any such features are included in one or more embodiments of the present disclosure, but may or may not necessarily be combined in the same embodiments.

As used herein, unless expressly stated to the contrary, use of the phrase "at least one of", "one or more of" and "and/or" are open ended expressions that are both conjunctive and disjunctive in operation for any combination of named elements, conditions, or activities. For example, each of the expressions "at least one of X, Y and Z", "at least one of X, Y or Z", "one or more of X, Y and Z", "one or more of X, Y or Z" and "A, B and/or C" can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms "first", "second", "third", etc., are intended to distinguish the particular nouns (e.g., blade, rotor, element, device, condition, module, activity, operation, etc.) they modify. Unless expressly stated to the contrary, the use of these terms is not intended to indicate any type of order, rank, importance, temporal sequence, or hierarchy of the modified noun. For example, "first X" and "second X" are intended to designate two X elements that are not necessarily limited by any order, rank, importance, temporal sequence, or hierarchy of the two elements. As referred to herein, "at least one of", "one or more of", and the like can be represented using the "(s)" nomenclature (e.g., one or more element(s)).

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. A vehicle comprising:
a center body;
a plurality of propulsion assemblies disposed around the center body, each of the propulsion assemblies comprising a rotor system configured to swivel about a pivot axis, wherein for each of the propulsion assemblies, the pivot axis of the propulsion assembly is fixedly oriented at an angular offset from a lateral axis of the vehicle in a plane defined by a longitudinal axis of the vehicle and parallel to the pivot axis of another one of the propulsion assemblies, wherein the pivot axis does not intersect with the center body; and
a flight control system in communication with the propulsion assemblies, wherein:
the flight control system is configured to activate a particular operational mode of a first one of the propulsion assemblies in response to detecting an operational state change of a second one of the propulsion assemblies,
in the particular operational mode, the rotor system of the first one of the propulsion assemblies is configured to swivel about the pivot axis of the first one of the propulsion assemblies to move a rotor axis of the rotor system of the first one of the propulsion assemblies from a first gimbal angle to a second gimbal angle, and
the second gimbal angle is determined based at least on: (i) a position of the first one of the propulsion assemblies relative to the second one of the propulsion assemblies, and (ii) a change in load on the first one of the propulsion assemblies due to the operational state change of the second one of the propulsion assemblies.

2. The vehicle of claim 1, wherein the second gimbal angle is determined further according to translation of a center of gravity (CG) of the vehicle from a first CG position to a second CG position.

3. The vehicle of claim 1, wherein the second gimbal angle is determined further according to thrust equalization on critically loaded ones of the propulsion assemblies.

4. The vehicle of claim 1, wherein the second gimbal angle is determined further according to a headwind direction relative to a translation direction of the vehicle.

5. The vehicle of claim 1, wherein for each of the propulsion assemblies, the swiveling of the rotor system of the propulsion assembly operates to change an attitude of the vehicle from a first attitude to a second attitude.

6. The vehicle of claim 1, wherein the flight control system is configured to detect the operational state change of the second one of the propulsion assemblies.

7. A propulsion system for a vehicle, the propulsion system comprising a plurality of propulsion assemblies disposed around a center body of the vehicle, wherein each of the propulsion assemblies comprise:
a drive system attached to a pylon, the pylon having a first end and an opposing second end;
a tail boom disposed at the first end of the pylon, the tail boom configured to function as a landing strut for the vehicle; and
a rotor system disposed at the second end of the pylon, the rotor system comprising a plurality of rotors configured to rotate around a rotor axis of the rotor system, wherein:
the drive system is configured to swivel the rotor system of the propulsion assembly about a pivot axis from a first position to a second position in response to an operational state change of another one of the propulsion assemblies,
the pivot axis is fixedly oriented at an angular offset from a lateral axis of the vehicle, parallel to the pivot axis of another one of the propulsion assemblies, and does not intersect with the center body of the vehicle, in the second position of the rotor system, the rotor axis forms a second angle with a centerline of the pylon, and the second angle is determined according to at least: (i) a position of the propulsion assembly relative to the another one of the propulsion assemblies, and (ii) change in load on the propulsion assembly from the operational state change of the another one of the propulsion assemblies.

8. The propulsion system of claim 7, wherein the drive system comprises:
- a servo actuator configured to be activated by a flight control system of the vehicle;
- a servo arm coupled to the servo actuator;
- a control rod coupled to the servo arm; and
- a control arm coupled to the control rod at one end and to the rotor system at another end.

9. The propulsion system of claim 8, wherein the control rod is coupled to the servo arm at one end by a first joint, and to the control arm at an opposing end by a second joint.

10. The propulsion system of claim 8, wherein the servo actuator is configured to move the servo arm from a third position to a fourth position.

11. The propulsion system of claim 7, wherein the rotor axis changes from a first orientation to a second orientation corresponding to swiveling the rotor system about the pivot axis from the first position to the second position.

12. A flight control system for controlling operation of a plurality of propulsion assemblies disposed around a main body of a vehicle, each of the propulsion assemblies comprising a rotor system configured to swivel about a pivot axis, wherein for each of the propulsion assemblies, the pivot axis of the propulsion assembly is fixedly oriented at an angular offset from a lateral axis of the vehicle in a plane defined by a longitudinal axis of the vehicle and parallel to the pivot axis of another one of the propulsion assemblies, wherein the pivot axis does not intersect with the main body of the vehicle, the flight control system configured to activate a particular operational mode of a first one of the propulsion assemblies in response to detecting an operational state change of a second one of the propulsion assemblies, wherein in the particular operational mode, the rotor system of the first one of the propulsion assemblies is configured to swivel about the pivot axis of the first one of the propulsion assemblies to move a rotor axis of the rotor system of the first one of the propulsion assemblies from a first gimbal angle to a second gimbal angle, and the second gimbal angle is determined based at least on: (i) a position of the first one of the propulsion assemblies relative to the second one of the propulsion assemblies, and (ii) a change in load on the first one of the propulsion assemblies due to the operational state change of the second one of the propulsion assemblies.

\* \* \* \* \*